US 7,054,796 B2

(12) United States Patent
Hux

(10) Patent No.: US 7,054,796 B2
(45) Date of Patent: May 30, 2006

(54) DETERMINING A GEOMETRIC ERROR OF A POLYGON IN A SUBDIVISION SURFACE

(75) Inventor: W. Allen Hux, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 09/789,383

(22) Filed: Feb. 20, 2001

(65) Prior Publication Data

US 2002/0116159 A1 Aug. 22, 2002

(51) Int. Cl.
*G06G 7/48* (2006.01)

(52) U.S. Cl. .......................... 703/2; 382/243; 358/1.9; 345/419

(58) Field of Classification Search ............... 703/2

See application file for complete search history.

(56) References Cited

OTHER PUBLICATIONS

Zorin-D et al., "Subdivision for Modeling and Animation" ACM SIGGRAPH 98 Course Notes (1998), p. 1-112.*
Junkins-S et al., "Subdividing Reality—Employing Subdivision Surfaces for Real-time Scalable 3D" Intel Labs, Intel Corporation Jun. 2000 p. 1-15.*
3D Modeling and Rendering—IT papers. search results for 1999,2000. p. 3 of 6.*

* cited by examiner

*Primary Examiner*—Paul L. Rodriquez
*Assistant Examiner*—Thomas Stevens
(74) *Attorney, Agent, or Firm*—Alan L. Pedersen-Giles

(57) ABSTRACT

Determining a geometric error of a polygon in a subdivision surface includes obtaining a value that corresponds to an angular difference between a face vector normal to a face of the polygon and a vertex vector normal to a vertex of the polygon, determining a geometric error associated with the vertex based on the value and the face vector, and calculating the geometric error of the polygon using the geometric error associated with the vertex.

30 Claims, 7 Drawing Sheets

DETERMINING A GEOMETRIC ERROR OF A POLYGON IN A SUBDIVISION SURFACE

TECHNICAL FIELD

This invention relates to subdividing a subdivision surface of a three-dimensional (3D) model.

BACKGROUND

A 3D model is made up of one or more polygons which define a subdivision surface. Subdividing the polygons increases the number of polygons in the 3D model and, thus, the granularity and the quality of the approximation of the surface represented by the 3D model. However, increasing surface granularity decreases rendering performance.

Uniform subdivision techniques subdivide each polygon in the 3D model the same number of times. By contrast, adaptive subdivision techniques subdivide different polygons in the 3D model different numbers of times.

DESCRIPTION OF DRAWINGS

Like reference numerals in different figures indicate like elements.

DETAILED DESCRIPTION

Figure 1:
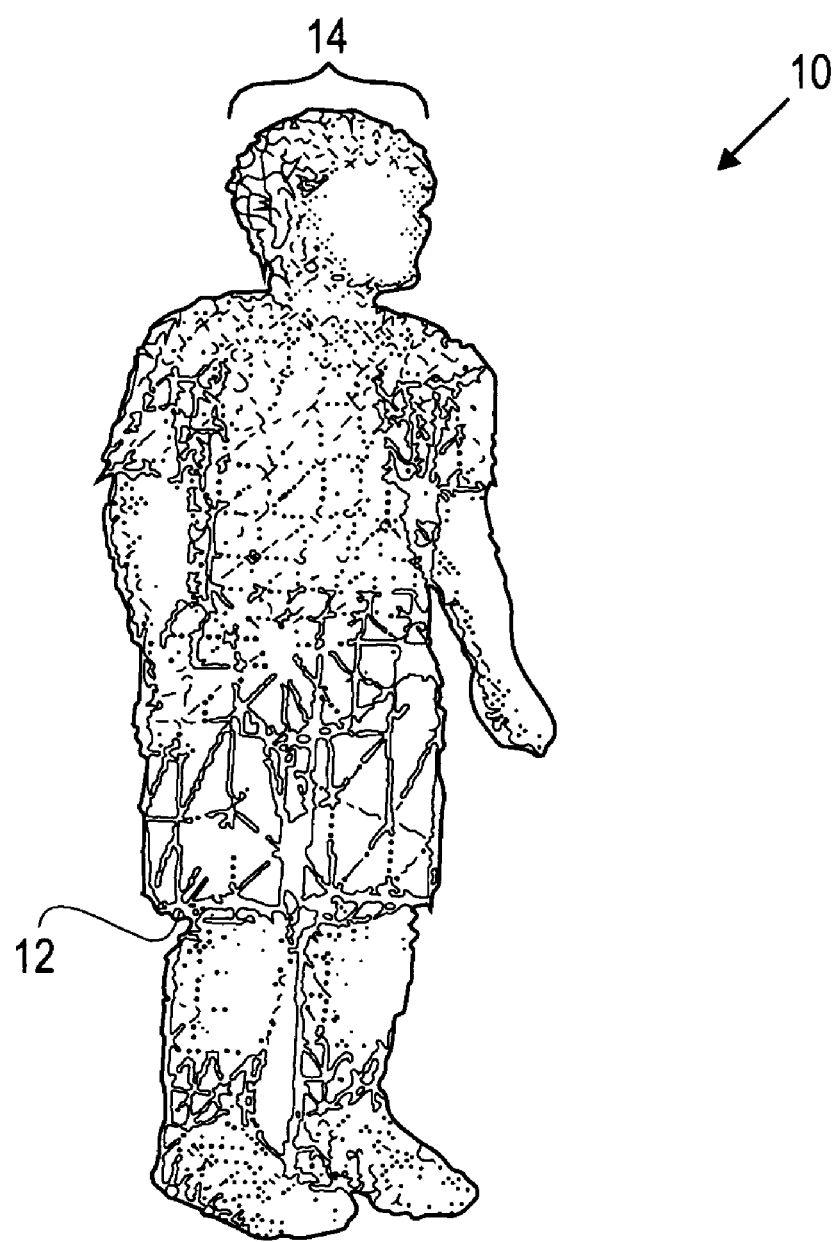
FIG. 1 is a perspective view of a 3D model comprised of subdivision surfaces.

Referring to FIG. 1, a 3D model 10 is comprised of interconnecting polygons 12. Polygons 12 are triangles in this embodiment; however, other types of polygons may be used. Groups of polygons are organized into meshes 14. Polygons that have not been subdivided make up a "base mesh".

One or more base meshes define an initial subdivision surface of 3D model 10. Each polygon in the initial subdivision surface can be subdivided one or more times, thereby increasing the number of polygons that make up 3D model 10. By increasing the number of polygons that make up 3D model 10, the resolution of 3D model 10 increases.

Figure 2:
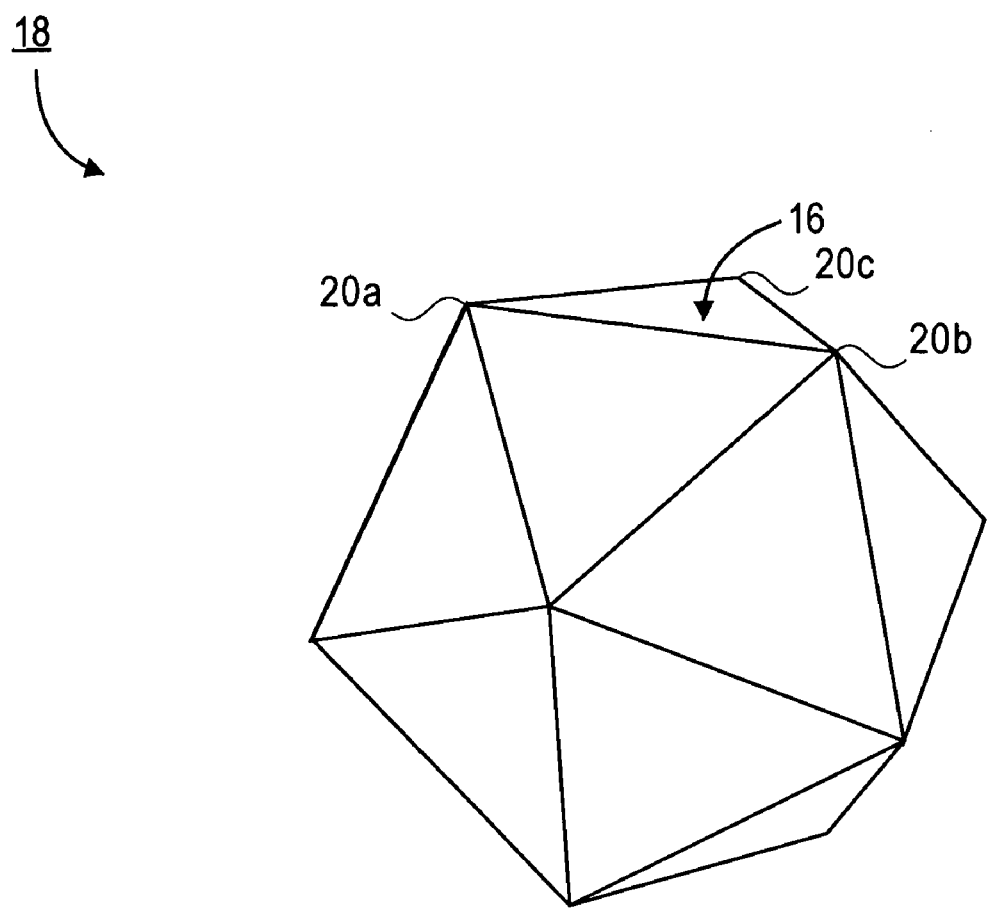
FIG. 2 is a perspective view of a subdivision surface.
Figure 3:
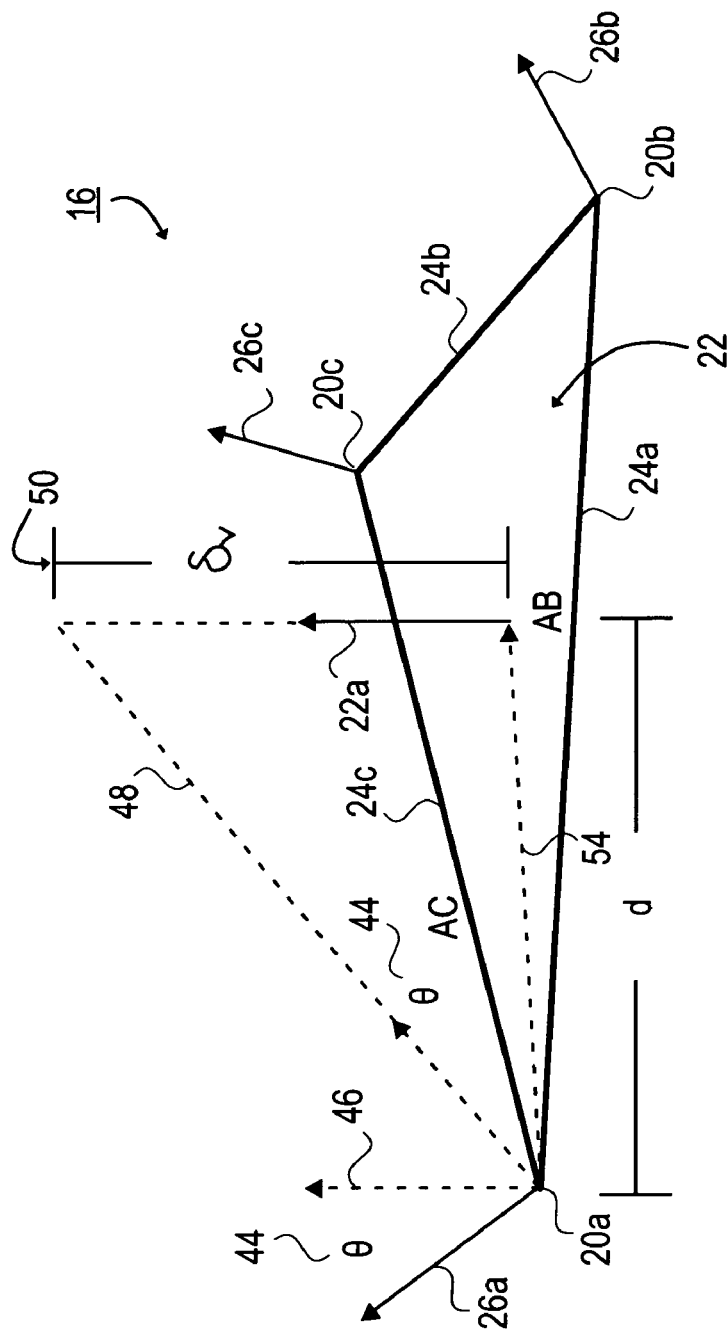
FIG. 3 is a perspective view of vectors included in a polygon that makes up the subdivision surface.

The 3D data for a subdivision surface defines the interconnecting polygons 12 that make up the subdivision surface. Referring to FIGS. 2 and 3, the 3D data for a polygon 16 in a subdivision surface 18 (which may be a part of 3D model 10) defines coordinates for three vertices 20a, 20b and 20c positioned in Cartesian XYZ (or other) 3D space. These vertices define a face 22 and edges 24a, 24b and 24c for polygon 16. The 3D data also defines a unit normal vector 26a, 26b and 26c to each vertex 20a, 20b and 20c and a unit normal vector 22a to face 22. The unit normal vectors for face 22 and vertices 20a, 20b and 20c have a magnitude of one and are orthogonal (i.e., normal) to subdivision surface 18. As a result, the vectors do not all point in the same angular direction. Rather, there is an angular difference between each of the vertex vectors and the face vector.

Data for face vector 22a may be stored beforehand along with the other 3D data for polygon 16. Alternatively, face vector 22a may be obtained from edges 24a, 24b and 24c of polygon 16 at run-time. The magnitude of face vector 22a may be obtained by normalizing the vector cross product of vectors AB (from vertex 20a to vertex 20b) and AC (from vertex 20a to vertex 20c). The coordinates, i.e., the location of face vector 22a on polygon 16, may be determined by calculating the average of the coordinates for vertices 20a, 20b and 20c.

Figure 4:
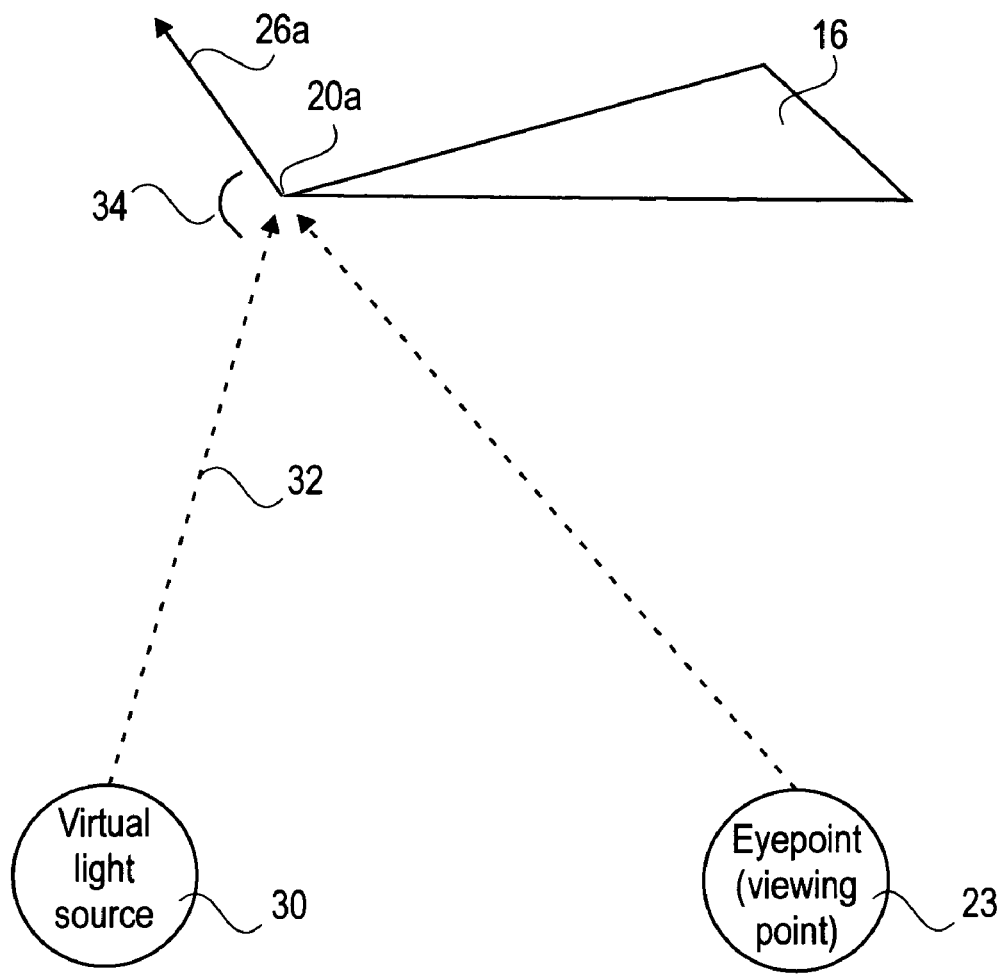
FIG. 4 is a perspective view of the polygon relative to a virtual light source and a virtual viewpoint.

The vertex vectors 26a, 26b and 26c at each respective vertex 20a, 20b and 20c affect how each vertex is perceived relative to a predefined reference point (an "eyepoint" 23—see FIG. 4) in the "virtual world" that subdivision surface 18 inhabits. Taking vertex 20a as an example in FIG. 4, vector 26a determines the amount of light that reaches vertex 20a from a virtual light source 30 in the virtual world. The amount of light corresponds to the dot product of vector 26a and a unit vector 32 from light source 30. The dot product value defines the cosine of angle 34 between the light and the normal. The amount of shading applied to each vertex, and consequently each polygon, is determined using this angle.

Figure 5:
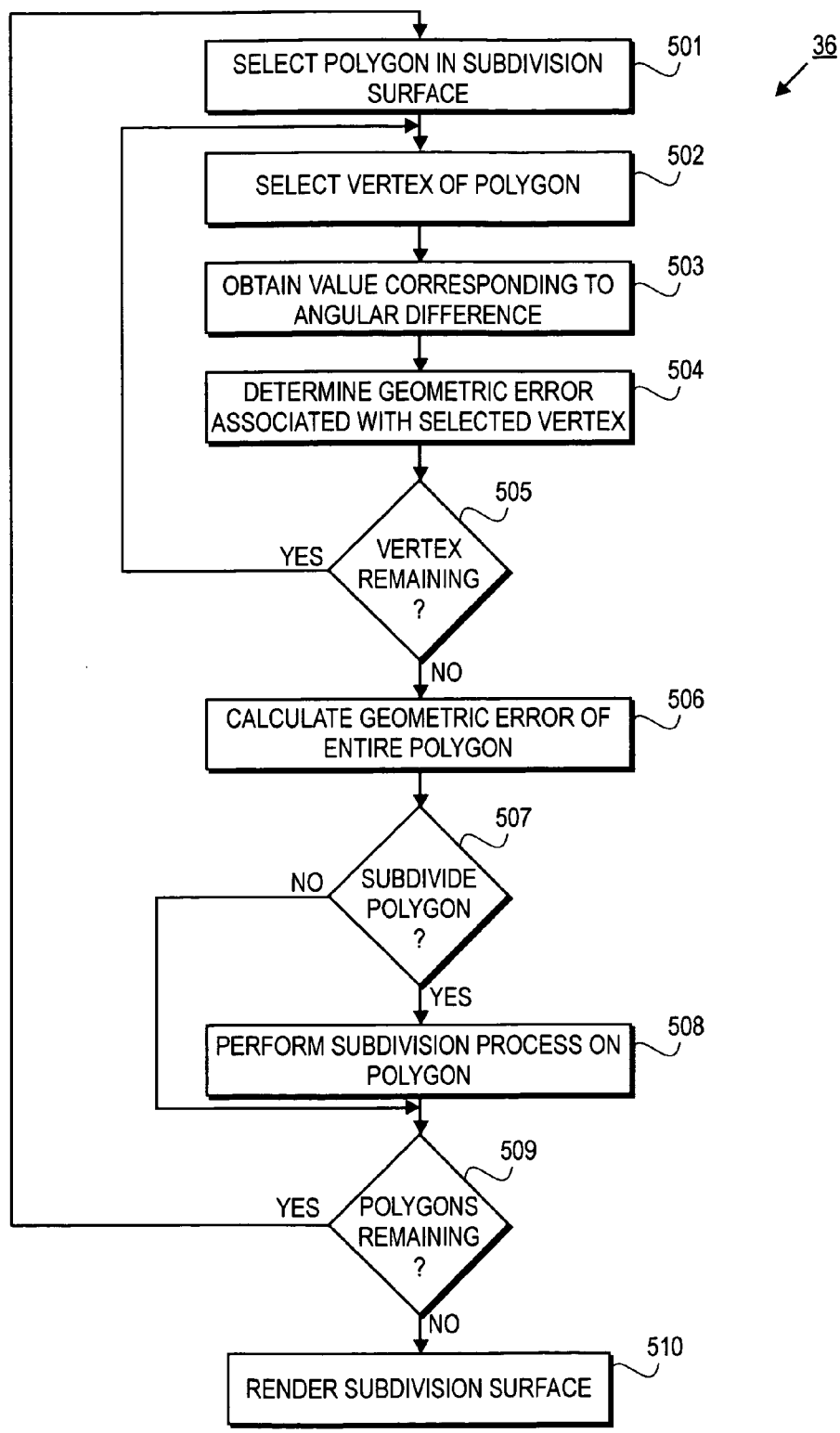
FIG. 5 is a flowchart showing a process for determining a geometric error of the polygon and for deciding whether to subdivide the polygon based on the geometric error.

The adaptive subdivision process 36 shown in FIG. 5 uses the vertex vectors and face vectors of a polygon when determining whether to subdivide that polygon. Process 36 subdivides polygons of subdivision surface 18 only in areas that provide the most visual impact to a viewer at eyepoint 23. For example, subdividing what appears to be a flat plane relative to eyepoint 23 will not provide substantial visible impact to the viewer. Process 36 therefore determines which polygons in subdivision surface 18 are most visually relevant to the viewer at eyepoint 23. Those polygons that meet a certain level of visual relevance are subdivided. A "visually relevant" polygon is a polygon of subdivision surface 18 that, if not subdivided enough, will have an adverse effect on quality of the subdivision surface/3D model. By subdividing visually relevant polygons and not others, process 36 uses less computing resources, e.g., processor time and memory, without substantially decreasing the visual quality of the resulting subdivided subdivision surface/3D model.

Figure 6:
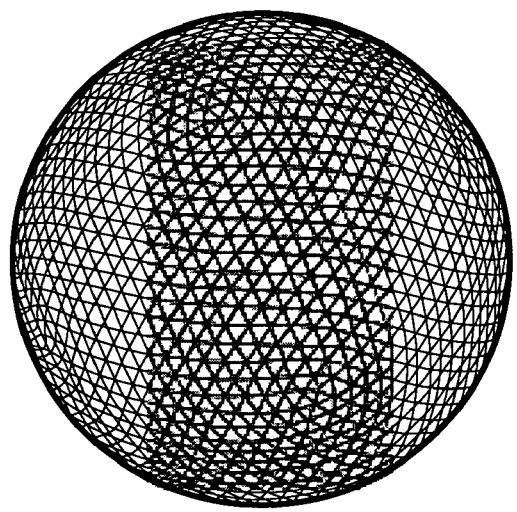
FIG. 6 is a perspective view of the subdivision surface of FIG. 2 subdivided using a conventional subdivision process.
Figure 7:
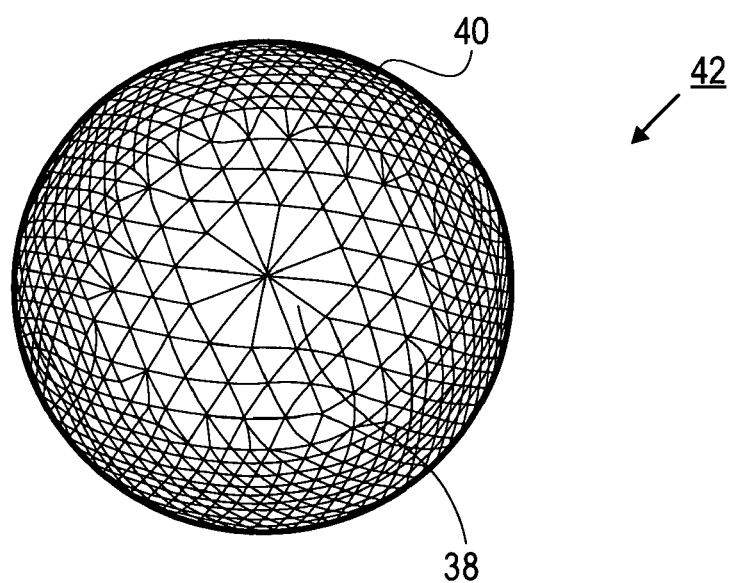
FIG. 7 is a perspective view of the subdivision surface of FIG. 2 subdivided using the subdivision process of FIG. 5.

Take subdivision surface 18 of FIG. 2 as an example. FIG. 2 shows the original, or "initial", subdivision surface 18. FIG. 6 shows polygons in that subdivision surface subdivided using a conventional subdivision technique. As is clear from FIG. 6, each polygon, regardless of its location relative to the viewer/eyepoint (not shown), is subdivided equally. FIG. 7 shows the polygons subdivided using process 36 (FIG. 5). In FIG. 7, those polygons 38 that do not have a substantial effect on the overall shape of the subdivision surface relative to the viewer are not subdivided. Such polygons include those that are perpendicular to the line of sight of the viewer. The remaining polygons 40 are subdivided appropriately to produce the desired effect.

Referring now to FIG. 5, process 36 is shown for subdividing subdivision surface 18 (FIG. 2) to obtain subdivision surface 42 (FIG. 7). Process 36 selects (501) a polygon, such as polygon 16 (FIG. 2), in subdivision surface 18. Process 36 selects (502) a vertex of polygon 16, such as vertex 20a. Process 36 obtains (503) values corresponding to the angular difference between face vector 22a for polygon 16 and vertex vector 26a for vertex 20a (FIG. 3). Referring to FIG. 3, there is an angular difference, θ, between face vector 22a and vertex vector 26*a*. As noted, this is because the face and vertex vectors are orthogonal to the entire subdivision surface 18, not simply to the plane defined by polygon 16.

As subdivision surface 18 approaches its limit surface, the value of θ will decrease. As background, the limit surface is the surface that results if subdivision surface 18 is subdivided to the point where its polygons have zero, or substantially zero, area. In the particular example of subdivision surface 18, the limit surface is a sphere; however, this is not the case for all subdivision surfaces. Accordingly, as the limit surface is approached, the face and vertex vectors converge and θ approaches zero.

FIG. 3 shows the angular difference, θ 44, depicted relative to vertex vector 26*a* and a projection 46 of face vector 22*a*. The angular difference, θ 44, is also shown relative the face 22 (i.e., the plane) of polygon 16. By projecting a vector 48 from vertex 20*a* at the angle θ, process 36 determines the geometric error, $\delta_v$, of vertex 20*a*.

In this context, the geometric error of vertex 20*a* is the contribution that vertex 20*a* makes to the geometric error of polygon 16. The geometric error of polygon 16 is the difference in distance between the location of face 22 and the projected location 50 of the limit surface of subdivision surface 18 that would be obtained by subdividing polygon 16. That is, if polygon 16 were subdivided to its limit surface, it would actually touch location 50. So, the geometric error, $\delta_v$, of vertex 20*a* is the amount that vertex 20*a* contributes to the difference between location 50 and face 22 of polygon 16.

Process 36 uses trigonometric values relating to the angular difference (θ) in determining $\delta_v$. That is, process 36 obtains (503) the sine of the angular difference (sin(θ)) and the cosine of the angular difference (sin(θ)) using face vector 22*a* and vertex vector 26*a*. Process 36 obtains cos(θ) by taking the vector dot product of vertex vector 26*a* and face vector 22*a* (which both have a magnitude of one). Process 36 obtains sin(θ) by taking the magnitude of the vector cross product of vertex vector 26*a* and face vector 22*a*.

Process 36 determines (504) the geometric error, $\delta_v$, vertex 26*a* based on sin(θ), cos(θ), and face vector 22*a*. In more detail, process 36 determines the geometric error, $\delta_v$, associated with vertex 20*a*, as follows:

$$\delta_v = (d \cdot \sin(\theta))/\cos(\theta), \quad (1)$$

where d is the distance 54 between face vector 22*a* and vertex vector 26*a* and $\delta_v$, sin(θ) and cos(θ) are as defined above. Process 36 determines the distance 54 (d) by taking the magnitude of the vector 56 from vertex 20*a* to the center point 58 of polygon 16. The center point 58 of polygon 16 is the location of face vector 22*a*. The location of face vector 22*a* is determined, as described above, by calculating the average of the coordinate locations of vertices 20*a*, 20*b* and 20*c*. Process 36 determines vector 56 by taking the difference of coordinates for vertex 20*a* and center point 58.

Once process 36 determines $\delta_v$ for vertex 20*a*, process 36 determines (505) if there are any vertices of polygon 16 for which $\delta_v$ has not been determined. If so, process 36 repeats 502 to 505 for all remaining vertices. Once the geometric error ($\delta_v$) has been determined for vertices 20*a*, 20*b* and 20*c*, process 36 calculates (506) the overall geometric error (δ) of the entire polygon 16. Process 36 does this by calculating the average of the geometric errors ($\delta_v$'s) for all vertices of polygon 16, in this case, vertices 20*a*, 20*b* and 20*c*.

For polygon 16, the geometric error (δ) is $$\delta = (\delta_{va} + \delta_{vb} + \delta_{vc})/3 \quad (2)$$

where $\delta_{va}$ is the geometric error associated with vertex 20*a*, $\delta_{vb}$ is the geometric error associated with vertex 20*b*, and $\delta_{vc}$ is the geometric error associated with vertex 20*c*. Once process 36 calculates (506) the geometric error of polygon 16, process 36 decides (507) whether to subdivide polygon 16.

Process 36 decides (507) whether to subdivide polygon 16 based on the overall geometric error (δ) of polygon 16. In more detail, process 36 decides to subdivide polygon 16 if the following inequality holds:

$$\delta^2(\|v-e\|^2 - ((v-e) \cdot n)^2) \geq k^2 \|v-e\|^4, \quad (3)$$

where δ is as defined above, v is the center point 58 of polygon 16 (the location of the face vector 22*a*), e is a position of a viewing point (e.g., eyepoint 23 of FIG. 4) for viewing polygon 16, n is face vector 22*a*, and k is a value related to the desired visual quality of subdivision surface 18. Equation (3) is the Hoppe equation and is described in Hughes, Hoppe, "View-Dependent Refinement of Progressive Meshes", Special Interest Group on Graphical Display (SIGGRAPH) '97 Proceedings (1997).

The first term of equation (3), namely "$\|v-e\|^2$", is the square of the distance of polygon 16 from eyepoint 23. The second term of the equation (3), namely "$((v-e) \cdot n)^2$", is indicative of the extent to which polygon 16 faces the eyepoint 23. If the difference between these two terms is greater than or equal to $k^2 \|v-e\|^4$, then process 36 subdivides polygon 16; otherwise, it does not. In essence, equation (3) says that polygons that are relatively near the eyepoint, not perpendicular to the direction of view, and with a high geometric error (δ) are candidates for subdivision.

Variable k in equation (3) is a user-settable tolerance factor that specifies an acceptable amount of precision in a resulting subdivision surface. Smaller values of k yield visually higher-quality subdivision surfaces and larger values of k yield visually lower-quality subdivision surfaces.

If process 36 decides (507) to subdivide polygon 16 based on equation (3), process 36 performs (508) a subdivision process on polygon 16. Any type of subdivision process may be used to perform the subdivision. Examples of subdivision processes that may be used include the butterfly subdivision process and the Catmull-Clark subdivision process. The butterfly subdivision process is described, e.g., in Dyn, N., Levin, D., and Gregory, J. A., "A Butterfly Subdivision Scheme for Surface Interpolation with Tension Control", Association for Computing Machinery (ACM) Transactions on Graphics 9 (1990). The Catmull-Clark subdivision process is described, e.g., in Stam, Jos., "Exact Evaluation of Catmull-Clark Subdivision Surfaces at Arbitrary Parameter Values", SIGGRAPH '98 Proceedings (1998); and Stam, Jos., "Exact Evaluation of Catmull-Clark Subdivision Surfaces at Arbitrary Parameter Values", SIGGRAPH 1999 Course Notes 37 Subdivision for Modeling and Animation (1999). Other subdivision processes may be used instead of, or in addition to, these.

Once polygon 16 has been subdivided (or if process 36 decides (507) not to subdivide polygon 16), process 36 determines (509) if there are any polygons remaining to be processed on subdivision surface 18. If so, process 36 returns to 501, where a new polygon is selected from subdivision surface 18 and subjected to 502 to 509. If no polygons remain to be processed in subdivision surface 18, process 36 renders (510) the subdivided version of subdivision surface 18. As noted, subjecting subdivision surface 18 to process 36 may result in the rendered subdivision surface 42 of FIG. 7. As noted above, those polygons 40 of subdivision surface 42 that have an effect on the visual quality of subdivision surface 18 are subdivided to a greater extent than those polygons 38 that have a lesser effect on its visual quality.

Figure 8:
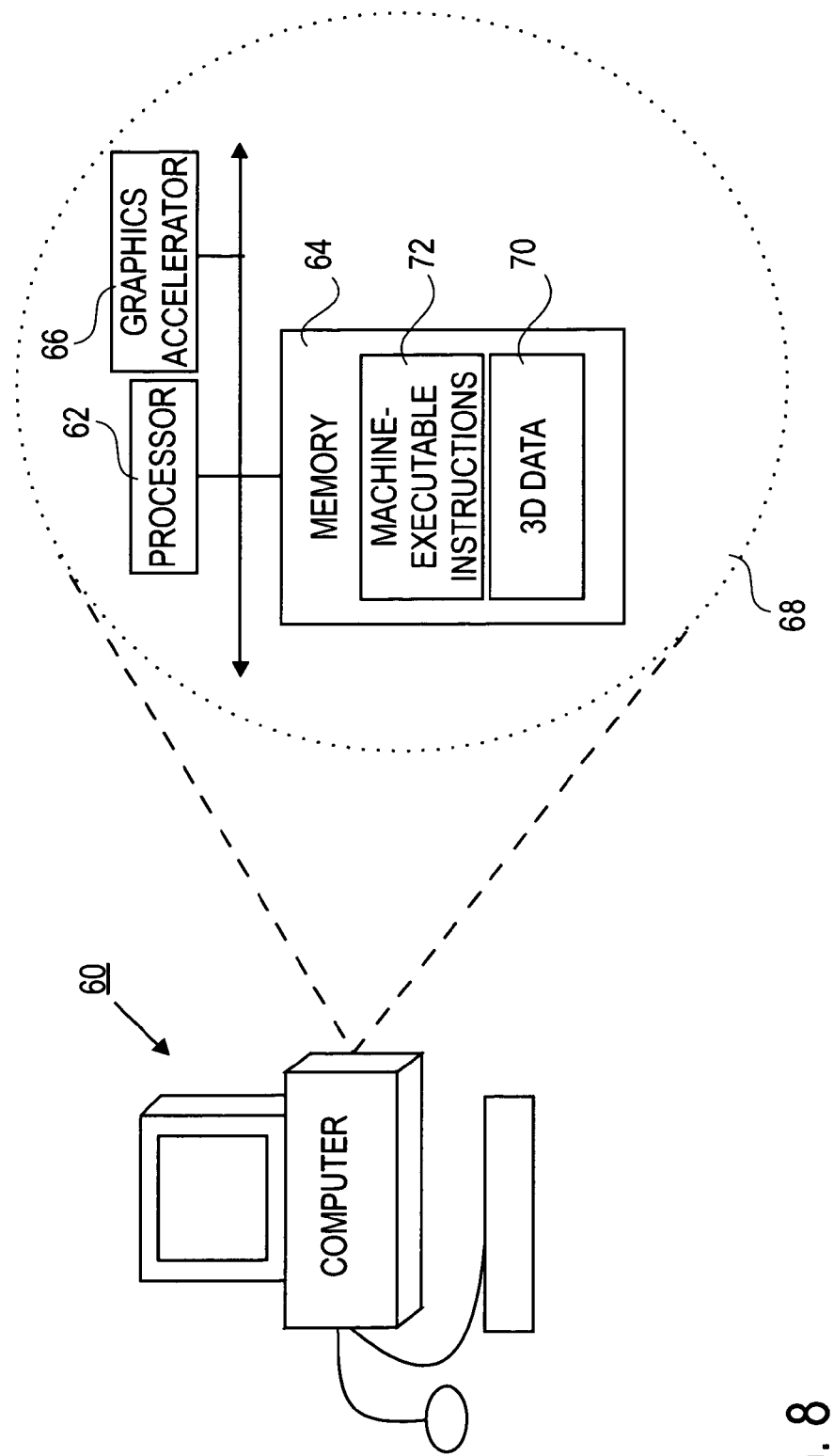
FIG. 8 is a block diagram of computer hardware that can be used to implement the process of FIG. 5.

FIG. 8 shows a computer 60 for rendering 3D objects using process 36. Computer 60 includes a processor 62, a memory 64 (e.g., a hard disk), and a 3D graphics accelerator 66 for processing 3D data (see view 68). Memory 64 stores 3D data 70 for subdivision surface 18, and machine-executable instructions 72 for performing process 36. Processor 62 and/or graphics accelerator 66 execute instructions 72 to perform process 36 on subdivision surface 18.

Process 36, however, is not limited to use with any particular hardware or software configuration, it may find applicability in any computing or processing environment. Process 36 may be implemented in hardware, software, or a combination of the two. Process 36 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 36 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 36. Process 36 may also be implemented as a computer-readable storage medium, configured with a computer program, where, upon execution, instructions in the computer program cause the computer to operate in accordance with process 36.

Process 36 is not limited to the embodiments described herein. Process 36 can be used with any subdivision surface, not just those shown in FIGS. 1 and 2. Process 36 may be used with free-standing subdivision surfaces or with subdivision surfaces that are part of the mesh of a larger 3D model. Process 36 is also not limited to the specific order shown in FIG. 5. The blocks of FIG. 5 may be reordered, if necessary, to produce the same, or similar, results.

Other embodiments not described herein are also within the scope of the following claims.

What is claimed is:

1. A method of determining a geometric error of a polygon in a subdivision surface, comprising:
   obtaining a value that corresponds to an angular difference between a face vector normal to a face of the polygon and a vertex vector normal to a vertex of the polygon;
   determining a geometric error associated with the vertex based on the value and the face vector; and
   calculating the geometric error of the polygon using the geometric error associated with the vertex for the use of a processor.

2. The method of claim 1, wherein obtaining the value comprises determining a vector dot product of the face vector and the vertex vector.

3. The method of claim 1, wherein obtaining the value comprises determining a magnitude of a vector cross product of the vertex vector and the face vector.

4. The method of claim 1, further comprising:
   determining a distance between a center of the face and the vertex vector;
   wherein the value comprises one of a sine of the angular difference and a cosine of the angular difference and the geometric error associated with the vertex is determined based also on the distance.

5. The method of claim 4, wherein the geometric error, $\delta_v$, associated with the vertex is determined as follows:

$$\delta_v = (d \cdot \sin(\theta))/\cos(\theta),$$

where d is the distance between the center of the face and the vertex vector, $\sin(\theta)$ is the sine of the angular difference, $\theta$, and $\cos(\theta)$ is the cosine of the angular difference, $\theta$.

6. The method of claim 1, wherein calculating comprises determining an average of geometric errors associated with vertices of the polygon, the average taking into account the geometric error determined based on the value and the face vector.

7. The method of claim 1, wherein the geometric error of the polygon comprises a difference in distance between the face of the polygon and a limit surface of the subdivision surface that is obtained by subdividing the polygon.

8. A method for use in subdividing a polygon in a subdivision surface, comprising:
   determining a geometric error associated with a vertex of the polygon based on an angular difference between a face vector normal to a face of the polygon and a vertex vector normal to a vertex of the polygon;
   calculating a geometric error of the polygon for the use in a processor using the geometric error associated with the vertex; and
   deciding whether to subdivide the polygon based on the geometric error of the polygon.

9. The method of claim 8, wherein it is decided to subdivide the polygon if $$\delta^2(\|v-e\|^2 - ((v-e) \cdot n)^2) \geq k^2 \|v-e\|^4,$$

where $\delta$ is the geometric error of the polygon, v is a position of a center of the polygon, e is a position of a viewing point of the polygon, n is the face vector, and k is a value related to visual quality of the subdivision surface.

10. The method of claim 8, further comprising obtaining trigonometric values that correspond to the angular difference between the face vector and the vertex vector;
   wherein the geometric error associated with the vertex of the polygon is calculated using the trigonometric values.

11. An article comprising:
   a machine-readable medium that stores executable instructions for determining a geometric error of a polygon in a subdivision surface, the instructions causing a machine to:
      obtain a value that corresponds to an angular difference between a face vector normal to a face of the polygon and a vertex vector normal to a vertex of the polygon;
      determine a geometric error associated with the vertex based on the value and the face vector; and
      calculate the geometric error of the polygon using the geometric error associated with the vertex for the use in a machine.

12. The article of claim 11, wherein obtaining the value comprises determining a vector dot product of the face vector and the vertex vector.

13. The article of claim 11, wherein obtaining the value comprises determining a magnitude of a vector cross product of the vertex vector and the face vector.

14. The article of claim 11, further comprising instructions that cause the machine to:
  determine a distance between a center of the face and the vertex vector;
  wherein the value comprises one of a sine of the angular difference and a cosine of the angular difference and the geometric error associated with the vertex is determined based also on the distance.

15. The article of claim 14, wherein the geometric error, $\delta_v$, associated with the vertex is determined as follows:

$$\delta_v = (d \cdot \sin(\theta))/\cos(\theta),$$

where d is the distance between the center of the face and the vertex vector, $\sin(\theta)$ is the sine of the angular difference, $\theta$, and $\cos(\theta)$ is the cosine of the angular difference, $\theta$.

16. The article of claim 11, wherein calculating comprises determining an average of geometric errors associated with vertices of the polygon, the average taking into account the geometric error determined based on the value and the face vector.

17. The article of claim 11, wherein the geometric error of the polygon comprises a difference in distance between the face of the polygon and a limit surface of the subdivision surface that is obtained by subdividing the polygon.

18. An article comprising:
  a machine-readable medium that stores executable instructions for use in subdividing a polygon in a subdivision surface, the instructions causing a machine to:
    determine a geometric error associated with a vertex of the polygon based on an angular difference between a face vector normal to a face of the polygon and a vertex vector normal to a vertex of the polygon;
    calculate a geometric error of the polygon using the geometric error associated with the vertex; and
    decide whether to subdivide the polygon based on the geometric error of the polygon for the use in a machine.

19. The article of claim 18, wherein it is decided to subdivide the polygon if $$\delta^2(\|v-e\|^2 - ((v-e) \cdot n)^2) \geq k^2 \|v-e\|^4,$$

where $\delta$ is the geometric error of the polygon, v is a position of a center of the polygon, e is a position of a viewing point of the polygon, n is the face vector, and k is a value related to visual quality of the subdivision surface.

20. The article of claim 18, further comprising instructions that cause the machine to obtain trigonometric values that correspond to the angular difference between the face vector and the vertex vector;
  wherein the geometric error associated with the vertex of the polygon is calculated using the trigonometric values.

21. An apparatus for determining a geometric error of a polygon in a subdivision surface, comprising:
  a processor that executes instructions to:
    obtain a value that corresponds to an angular difference between a face vector normal to a face of the polygon and a vertex vector normal to a vertex of the polygon;
    determine a geometric error associated with the vertex based on the value and the face vector; and
    calculate the geometric error of the polygon using the geometric error associated with the vertex.

22. The apparatus of claim 21, wherein obtaining the value comprises determining a vector dot product of the face vector and the vertex vector.

23. The apparatus of claim 21, wherein obtaining the value comprises determining a magnitude of a vector cross product of the vertex vector and the face vector.

24. The apparatus of claim 21, where:
  the processor executes instructions to determine a distance between a center of the face and the vertex vector;
  the value comprises one of a sine of the angular difference and a cosine of the angular difference; and
  the geometric error associated with the vertex is determined based also on the distance.

25. The apparatus of claim 24, wherein the geometric error, $\delta_v$, associated with the vertex is determined as follows:

$$\delta = (d \cdot \sin(\theta))/\cos(\delta),$$

where d is the distance between the center of the face and the vertex vector, $\sin(\delta)$ is the sine of the angular difference, $\theta$, and $\cos(\theta)$ is the cosine of the angular difference, $\theta$.

26. The apparatus of claim 21, wherein calculating comprises determining an average of geometric errors associated with vertices of the polygon, the average taking into account the geometric error determined based on the value and the face vector.

27. The apparatus of claim 21, wherein the geometric error of the polygon comprises a difference in distance between the face of the polygon and a limit surface of the subdivision surface that is obtained by subdividing the polygon.

28. An apparatus for use in subdividing a polygon in a subdivision surface, comprising:
  a processor that executes instructions to:
    determine a geometric error associated with a vertex of the polygon based on an angular difference between a face vector normal to a face of the polygon and a vertex vector normal to a vertex of the polygon;
    calculate a geometric error of the polygon using the geometric error associated with the vertex; and
    decide whether to subdivide the polygon based on the geometric error of the polygon.

29. The apparatus of claim 28, wherein it is decided to subdivide the polygon if $$\delta^2(\|v-e\|^2 - ((v-e) \cdot n)^2) \geq k^2 \|v-e\|^4,$$

where $\delta$ is the geometric error of the polygon, v is a position of a center of the polygon, e is a position of a viewing point of the polygon, n is the face vector, and k is a value related to visual quality of the subdivision surface.

30. The apparatus of claim 28, wherein:
  the processor executes instructions to obtain trigonometric values that correspond to the angular difference between the face vector and the vertex vector; and
  the geometric error associated with the vertex of the polygon is calculated using the trigonometric values.

* * * * *